(12) United States Patent
Finn (10) Patent No.: US 11,118,545 B2
(45) Date of Patent: Sep. 14, 2021

(54) PRECLEANER SYSTEM

(71) Applicant: Caterpillar Inc., Deerfield, IL (US)

(72) Inventor: Timothy Finn, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 273 days.

(21) Appl. No.: 16/365,286

(22) Filed: Mar. 26, 2019

(65) Prior Publication Data

US 2020/0309073 A1 Oct. 1, 2020

(51) Int. Cl.
| | |
|---|---|
| *B01D 53/00* | (2006.01) |
| *F02M 35/022* | (2006.01) |
| *B01D 45/16* | (2006.01) |
| *F02M 35/02* | (2006.01) |
| *F02M 35/04* | (2006.01) |
| *F02M 35/08* | (2006.01) |
| *F02M 35/10* | (2006.01) |
| *B01D 46/52* | (2006.01) |

(Continued)

(52) U.S. Cl.
CPC ......... *F02M 35/0223* (2013.01); *B01D 45/16* (2013.01); *F02M 35/0215* (2013.01); *F02M 35/044* (2013.01); *F02M 35/086* (2013.01); *F02M 35/10386* (2013.01); *F02M 35/10393* (2013.01); *B01D 46/0005* (2013.01); *B01D 46/525* (2013.01); *B01D 46/527* (2013.01); *B01D 50/002* (2013.01); *F02M 35/0216* (2013.01); *F02M 35/084* (2013.01); *F02M 35/10013* (2013.01)

(58) Field of Classification Search
CPC ........... F02M 35/0223; F02M 35/0215; F02M 35/044; F02M 35/086; F02M 35/10386; F02M 35/10393; F02M 35/10013; F02M 35/084; F02M 35/0216; B01D 45/16; B01D 46/525; B01D 50/002; B01D 46/527; B01D 46/0005
See application file for complete search history.

(56) References Cited

U.S. PATENT DOCUMENTS 2,806,551 A * 9/1957 Heinrich ................... B04C 3/04
55/340
3,421,296 A * 1/1969 Beurer, Sr. .............. F02B 61/04
55/306

(Continued)

FOREIGN PATENT DOCUMENTS

| DE | 102015001223 | 8/2016 |
|---|---|---|
| EP | 2949911 | 12/2015 |

(Continued)

*Primary Examiner* — Dung H Bui
(74) *Attorney, Agent, or Firm* — Procopio, Cory, Hargreaves & Savitch LLP (57) ABSTRACT

A precleaner system for an air intake system. The precleaner system includes precleaners each having flow paths that induce a rotation to air flow and separate out particulate matter. The particulate matter is ejected from an outlet port in each of the flow paths and out of a dust ejector. The precleaned air is collected into a plenum from each of the precleaners. The precleaned air can flow from the plenum to a precleaner system outlet and the precleaned air can be received by an air intake system. A cover can be used to block air flow through one of the precleaners to tune the precleaner system to the desired airflow.

16 Claims, 5 Drawing Sheets

(51) Int. Cl.
*B01D 50/00* (2006.01)
*B01D 46/00* (2006.01)

(56) References Cited

U.S. PATENT DOCUMENTS

| | | | | |
|---|---|---|---|---|
| 3,825,212 | A * | 7/1974 | Darges | B64D 13/08 |
| | | | | 244/118.5 |
| 4,242,115 | A * | 12/1980 | Harold | B01D 45/16 |
| | | | | 55/347 |
| 4,514,193 | A * | 4/1985 | Booth | B01D 45/16 |
| | | | | 55/290 |
| 4,985,058 | A * | 1/1991 | Prinsloo | B04C 3/06 |
| | | | | 55/457 |
| 5,498,273 | A * | 3/1996 | Mann | B01D 45/12 |
| | | | | 55/396 |
| 7,008,467 | B2 | 3/2006 | Krisko et al. | |
| 7,329,326 | B2 | 2/2008 | Wagner et al. | |
| 7,364,601 | B2 | 4/2008 | Xu et al. | |
| 7,674,308 | B2 | 3/2010 | Krisko et al. | |
| D635,233 | S | 3/2011 | Nelson et al. | |
| 7,959,702 | B2 | 6/2011 | Rocklitz et al. | |
| 8,101,003 | B2 | 1/2012 | Krisko et al. | |
| 8,177,872 | B2 | 5/2012 | Nelson et al. | |
| 8,216,334 | B2 | 7/2012 | Nelson et al. | |
| 8,246,707 | B2 | 8/2012 | Xu et al. | |
| 8,425,641 | B2 * | 4/2013 | Chaudhari | B04C 3/06 |
| | | | | 55/319 |
| 8,545,589 | B2 | 10/2013 | Rocklitz et al. | |
| 8,778,043 | B2 | 7/2014 | Krisko et al. | |
| 8,951,337 | B2 | 2/2015 | Cummins | |
| 9,242,199 | B2 | 1/2016 | Nelson et al. | |
| 9,320,997 | B2 | 4/2016 | Campbell et al. | |
| 9,492,775 | B2 | 11/2016 | Amsden et al. | |
| 9,675,920 | B2 * | 6/2017 | Finn | F02M 35/0216 |
| 9,795,907 | B2 | 10/2017 | Crary et al. | |
| 10,029,202 | B2 | 7/2018 | Nelson et al. | |
| 2004/0151652 | A1 * | 8/2004 | Herold | B01J 8/0055 |
| | | | | 423/335 |
| 2009/0211696 | A1 | 8/2009 | Moe et al. | |
| 2010/0024522 | A1 * | 2/2010 | Hartshorne | B01D 45/16 |
| | | | | 73/28.04 |
| 2010/0267540 | A1 | 10/2010 | Babb et al. | |
| 2010/0275561 | A1 * | 11/2010 | Lundquist | B04C 3/06 |
| | | | | 55/456 |
| 2011/0252964 | A1 * | 10/2011 | Wahlquist | B01D 46/48 |
| | | | | 95/20 |
| 2012/0234168 | A1 | 9/2012 | Tofsland et al. | |
| 2013/0327002 | A1 * | 12/2013 | Ackermann | B04C 3/00 |
| | | | | 55/327 |
| 2014/0260129 | A1 | 9/2014 | Rosenfeld et al. | |
| 2016/0177893 | A1 | 6/2016 | Finn et al. | |
| 2017/0151520 | A1 | 6/2017 | Clarcor | |
| 2019/0091703 | A1 * | 3/2019 | Hyun | A47L 9/1616 |

FOREIGN PATENT DOCUMENTS

| | | | |
|---|---|---|---|
| EP | 3020954 | | 5/2016 |
| WO | 2004007054 | A1 | 1/2004 |
| WO | 2014210541 | A1 | 12/2014 |
| WO | 2015061474 | | 4/2015 |
| WO | WO-2016105560 | A2 * | 6/2016 ............ B01D 46/26 |

\* cited by examiner

PRECLEANER SYSTEM

TECHNICAL FIELD

The present disclosure generally pertains to an air cleaner. More particularly this application is directed toward a precleaner system.

BACKGROUND

Currently, there are limited options for external precleaners for use with engine intake air filters that provide desirable efficiency The options that are available typically require use of exhaust scavenging to achieve peak efficiency and are not to meet different airflow speed demands. Exhaust scavenging is inconsistent, costly, and is not always possible due to the proximity of the air filter to the exhaust stack.

U.S. Pat. No. 9,795,907, to Crary describes an adapter assembly that includes an adapter body extending from an adapter inlet to an adapter outlet, a canister mount for securing the adapter body to an air filter canister, and an adapter joint for securing the adapter body to the canister mount. The canister mount includes a collar that is secured about the air filter canister. The adapter joint allows the adapter body to be moved away from the air filter canister for air filter replacement without having to disconnect the adapter body from the air filter canister. Precleaners are airtightly securable to the adapter body inlet, and the air filter canister is airtightly securable to the adapter body outlet. Air cleaned by the precleaners before reaching the air filter has less contamination to be filtered by the air filter before the air flows into an engine.

The present disclosure is directed toward overcoming one or more of the problems discovered by the inventors.

SUMMARY

A precleaner system for precleaning intake air for an air intake system is disclosed herein. The precleaner system includes a plurality of precleaners. Each precleaner includes a precleaner outlet wall. The precleaner outlet wall, and has a plurality of precleaner outlets extending through the precleaner outlet wall. Each precleaner outlet is in fluid communication with the intake air.

The precleaner system further includes a housing, a plenum, and a first cover. The housing extends between each precleaner. The plenum is formed by the housing and each precleaner outlet wall and is in fluid communication with the plurality of precleaner outlets. The first cover is formed to block a plurality of precleaner outlets of at least one of the plurality of precleaners.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
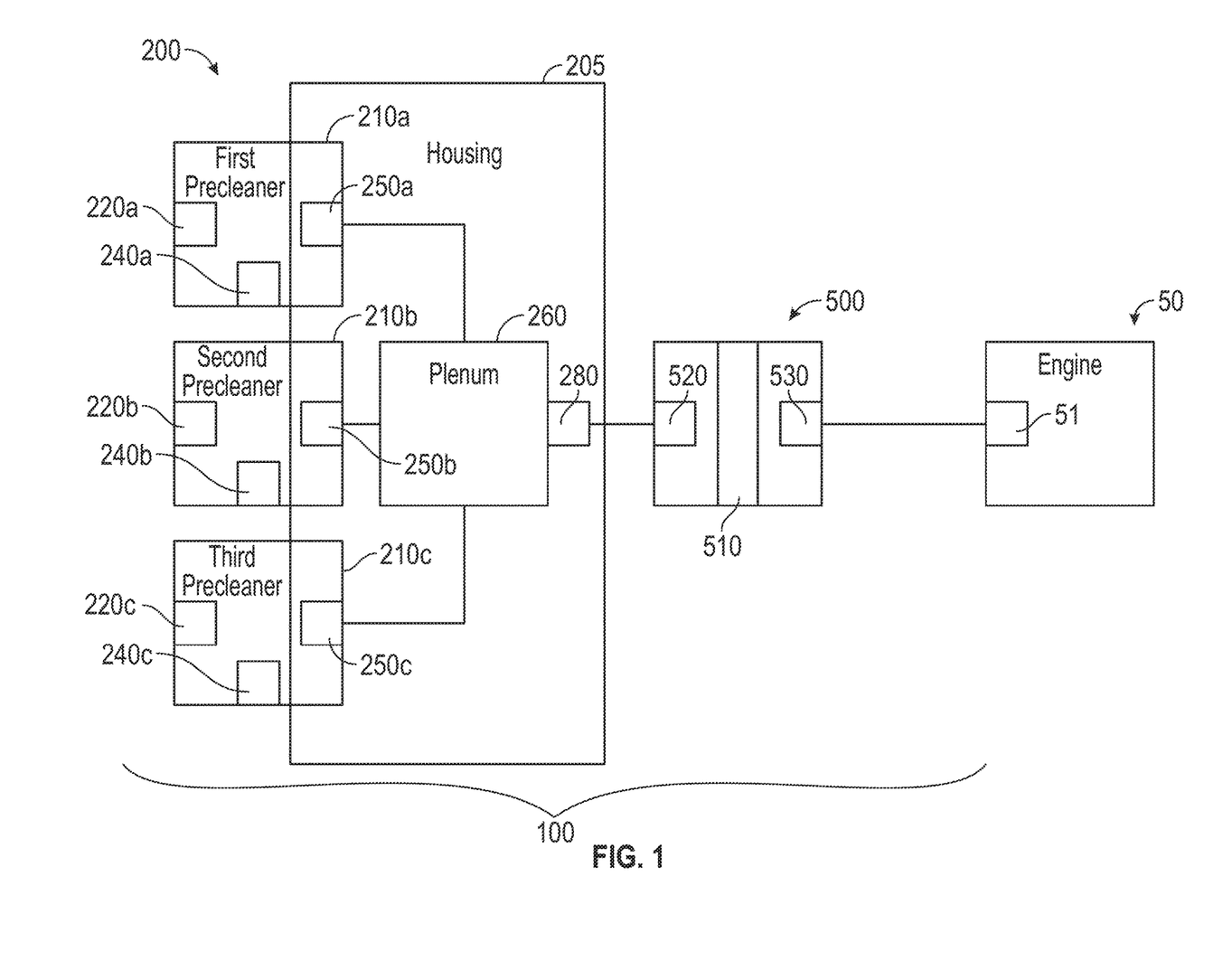
FIG. 1 is a functional block diagram of an example engine with an air intake system with a precleaner system.

FIG. 1 is a block diagram of an example engine with a precleaner. As shown in FIG. 1, the air intake system 100 may include a precleaner system 200 and an air filter system 500. The air intake system 100 may be operable for use with an internal combustion engine 50 or any other engine known in the art. The air intake system 100 can receive environmental air (i.e. intake air) and remove particulate matter such as dust, dirt, particulates, water, and other like debris from the intake air, and direct cleaned intake air to the engine 50 for use in the combustion process.

The air intake system 100 can be a two stage system. The first stage can be the precleaner system 200, upstream of a serviceable primary filter cartridge 510 in the air filter system 500. The precleaner system 200 can provide for a first stage removal of particulate matter or other contaminates, prior to the air reaching the air filter system 500. The precleaner system 200 can be an upstream component which operates without passage of the air through media, but rather uses a cyclonic or centrifugal approach to separate particulate matter.

A housing 205 can be formed to contain or encompass various components of the precleaner system 200. Air to be filtered can enter the precleaner system 200 into a first precleaner 210a, a second precleaner 210b, and a third precleaner 210c, at a first precleaner intake 220a, a second precleaner intake 220b, and a third precleaner intake 220c respectively. Though three precleaners are shown in the figure, fewer or more precleaners can be used. For example, two, four or five precleaners can be used. Particulate matter separated within the precleaners 210a, 210b, 210c, can be ejected through dust ejectors such as a first dust ejector 240a, a second dust ejector 240b, and a third dust ejector 240c, respectively. Air may then pass out of the precleaners 210a, 210b, and 210c, through precleaner outlet walls such as a first precleaner outlet wall 250a, a second precleaner outlet wall 250b, and a precleaner outlet wall 250c, respectively. The air that is passing through the precleaner outlet walls 250a, 250b, 250c may be collected in a plenum 260, as shown by lines connecting the precleaner outlet walls 250a, 250b, 250c to the plenum 260. The air may exit the precleaner system 200 from the plenum 260 via a precleaner system outlet 280. The precleaner system outlet 280 can be in fluid communication with an air passage 520 of the air filter system 500.

The precleaned air can be received by the air filter system 500 at the air passage 520 and passes through a primary filter cartridge 510 and into a clean air region prior to exiting the air intake system 100. The cleaned air can be directed via air passage 530 to downstream equipment, such as an engine intake 51 of the engine 50.

Figure 2:
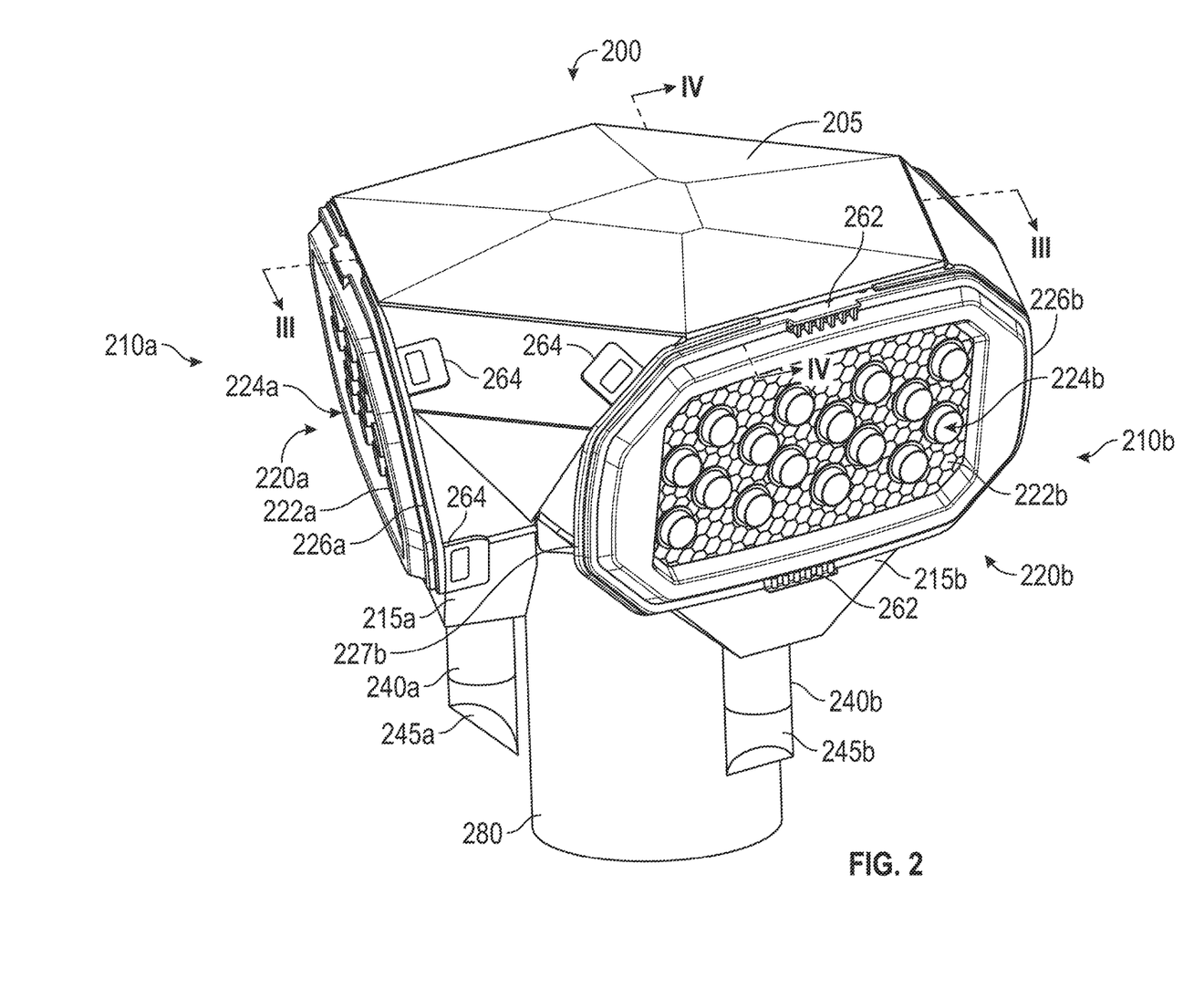
FIG. 2 is a perspective view of the exemplary precleaner system of FIG. 1.

FIG. 2 is a perspective view of the exemplary precleaner system 200 of FIG. 1. The precleaner system 200 includes multiple precleaners and can include a first precleaner 210a and a second precleaner 210b. The precleaners described herein may contain similar features. It is appreciated that the description provided for one precleaner and its components, such as the first precleaner 210a, can also apply to the second precleaner 210b described and any additional precleaners.

The precleaner system 200 includes the housing 205 and the precleaner system outlet 280. The precleaning system outlet 280 can extend away from the housing 205 and can be shaped as a hollow cylinder such as an outer surrounding cylindrical wall or tube. The housing 205 can be formed to accept multiple precleaners such as a first precleaner 210a and a second precleaner 210b, and others not shown. The housing 205 can be formed to receive a portion of the precleaners 210a, 210b and can position multiple precleaners in a predetermined relationship to each other. The housing 205 can allow multiple precleaners to interact with each other as one precleaner system 200. The housing 205 can extend from adjacent the precleaners 210a, 210b and can be partially disposed between the precleaners 210a, 210b. The precleaners 210a, 210b, can be disposed at similar heights. The precleaners 210a, 210b, can each be disposed along an edge of a hexagon formed at the top of the housing 205. The precleaners 210a, 210b, can be formed to be removable from the housing 205.

The first precleaner 210a can be disposed outside of the housing 205 and precleaner system outlet 280 and include a first precleaner intake 220a for receiving intake air. The first precleaner intake 220a can include a first intake wall 222a. First flow paths 224a can extend through the first intake wall 222a. The first precleaner intake 220a can be formed to be removed from the first precleaner 210a. The first precleaner intake 220a can include a clip 264 disposed proximate to the first intake wall 222a and formed to connect the first precleaner intake 220a to the first precleaner 210a. The first precleaner intake 220a can include a first intake right side 226a disposed to the right side of the first precleaner intake 220a. The first precleaner intake 220a can include a clip 264 that may be disposed proximate to the first intake right side 226a. The first precleaner 210a can include multiple clips 264.

The first precleaner 210a can include sixteen first flow paths 224a. The first flow paths 224a can be evenly spaced from each other and oriented in rows and columns. The first flow paths 224a can be in fluid communication with air from the environment. The first flow paths 224a can include curved blades or vanes (not shown) to encourage a rotating airflow. The first precleaner 210a can include a first duct 215a disposed below the first flow paths 224a and first intake wall 222a. The first duct 215a can taper from larger proximate the first flow paths 224a to narrower distal the first flow paths 224a. The first dust ejector 240a can extend from the first duct 215a away from the first flow paths 224a and the first intake wall 222a. The dust ejector 240a can be in fluid communication with the first duct 215a. The first dust ejector 240a can be shaped as a hollow cylinder such as an outer surrounding cylindrical wall or tube. The first dust injector 240a can include a first valve 245a disposed distal to the first duct 215a. The first valve 245a can be configured to prevent air from flowing into the first precleaner 210a via dust ejector 240a and can allow passage of particular matter and moisture out of the first precleaner 210a. The first valve 245a can comprise a flap valve.

Figure 3:
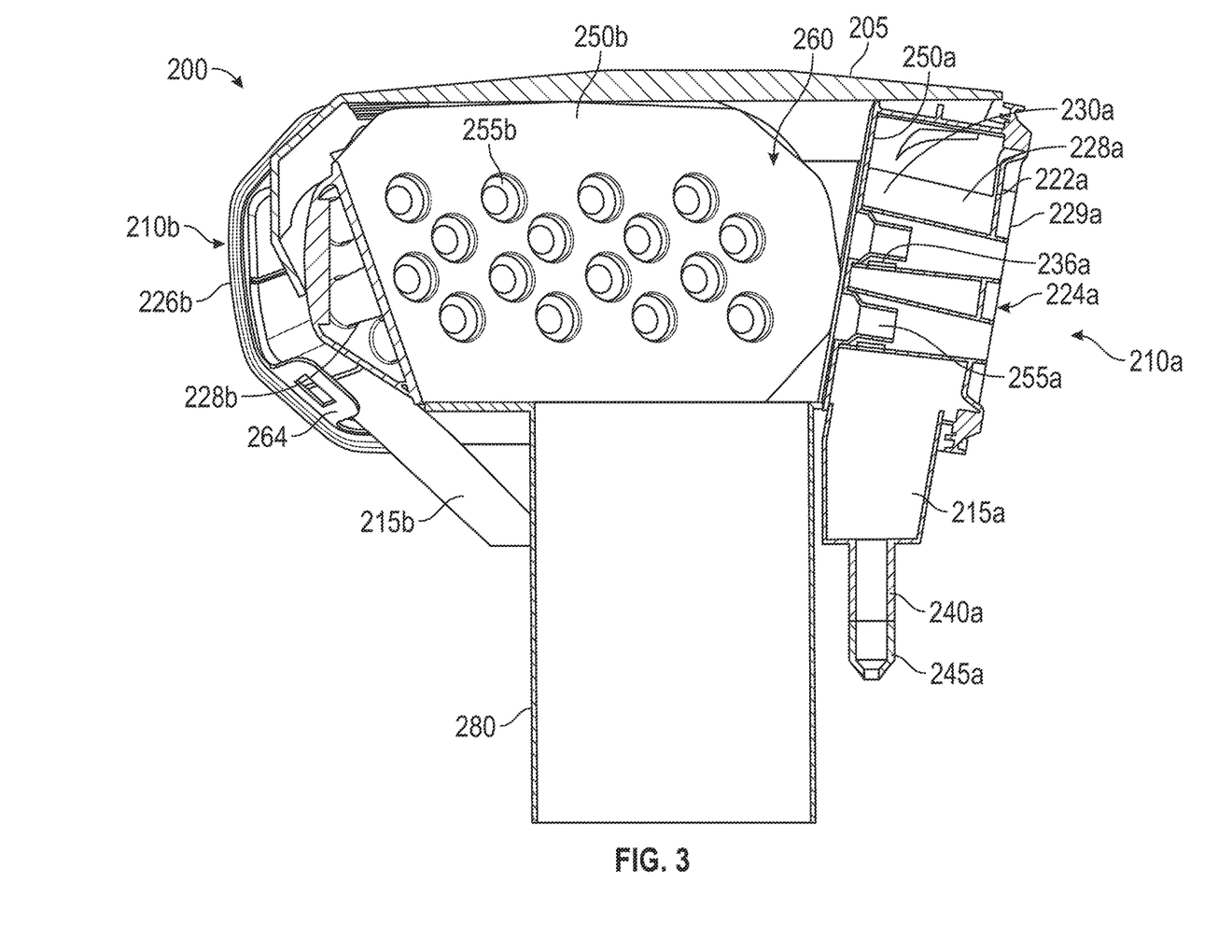
FIG. 3 is a cross section of the precleaner system in FIG. 2 along line III-III.

The second precleaner 210b can include the second precleaner intake 220b, second flow paths 224b, a second duct 215b, and a second dust ejector 240b. The second precleaner intake 220b can include a second intake wall 222b. The second precleaner intake 220b can also include a second intake right side 226b and a second intake left side 227b. The second intake left side 227b can be disposed at the left side of the second precleaner intake 220b and the second intake right side 226b can be disposed at the right side of the second precleaner intake 220b. In other words the second intake right side 226b is disposed opposite of the second intake left side 227b. The second intake left side 227b can be disposed proximate to the first intake right side 226a. The second precleaner 210b can include clips 264 disposed proximate to the second intake right side 226b and the second intake left side 227b. The second precleaner 210b can include a second valve 245b FIG. 3 is a cross section of the precleaner system of FIG. 2 along plane The first flow paths 224a each can include a first passage 228a for example, in the form of an outer surrounding cylindrical wall or tube. The first passages 228a can each have a first passage inlet 229a disposed proximate to the first intake wall 222a and a first passage outlet 230a disposed opposite of the first passage inlet 229a. In other words, the first passage outlet 230a can be disposed at the downstream end of the first passage 228a and can be proximate to the first precleaner outlet wall 250a. In other words the first passage inlet 229a will be oriented upstream to the first passage outlet 230a. The first passage inlet 229a and first passage outlet 230a can be in fluid communication with each other. The first passages 228a can be tapered from narrower proximate the first passage inlet 229a to wider proximate the first passage outlet 230a. In other words, the first passage inlet 229a can have a smaller diameter than the first passage outlet 230a. The first passages 228a can also include vanes. The first passages 228a can each include at its first passage outlet 230a a first outlet port 236a oriented in a direction towards the first duct 215a and the first dust ejector 240a. The first duct 215a can be in fluid communication with the first outlet port 236a. The first passage inlet 229a can be received within the first intake wall 222a. The first intake wall 222a can include holes sized to receive the first passage inlet 229a, for example, in the form of an upstream end of the first flows path 224a. The first precleaner outlet wall 250a can include a first precleaner outlet 255a that extends though the first precleaner outlet wall 250a and can extend into or be received within the first passages 228a. The precleaner outlet wall 250a can be molded as an integral part of the first precleaner 210a or as part of the housing 205. Each of the first passage outlets 230a of the first passages 228a can be oriented over a corresponding first precleaner outlet 255a and be in fluid communication with the corresponding first precleaner outlet 255a.

The first intake wall 222a can be angled down and may not be parallel with the precleaner system outlet 280. The first intake wall 222a can be parallel with the first precleaner outlet wall 250a. The first precleaner outlet wall 250a can be angled from vertical and may not be parallel with the precleaner system outlet 280. In an embodiment, the first precleaner outlet wall 250a is integral with and molded with the housing 205. A lowest point of the first passage inlet 229a can be disposed lower than a lowest point of the first passage outlet 230a.

The second precleaner outlet wall 250b can include a second precleaner outlet 255b. In an embodiment, the second precleaner outlet wall 250b is integral with and molded with the housing 205. The second precleaner 210b can include clips 264.

The plenum 260 can be formed by the first precleaner outlet wall 250a, the second precleaner outlet wall 250b, and the housing 205. The first precleaner outlet 255a and second precleaner outlet 255b can be in fluid communication with the plenum 260. The plenum 260 can be in fluid communication with the precleaner system outlet 280.

Figure 4:
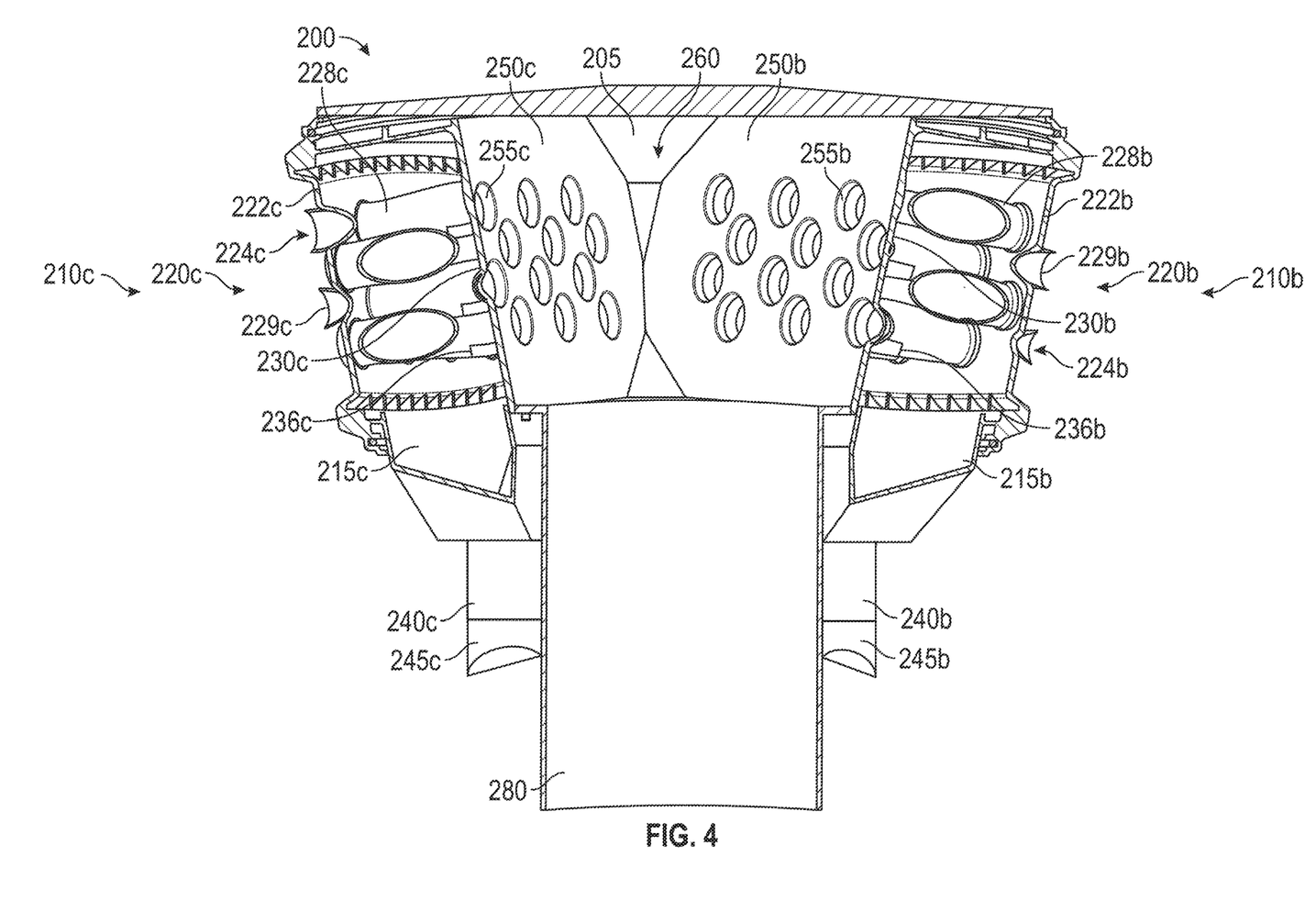
FIG. 4 is a cross section of the precleaner system in FIG. 2 along line IV-IV.

FIG. 4 is a cross section of the precleaner system of FIG. 2 along plane IV-IV. The second flow paths 224b can each include a second passage 228b. The second passage 228b can have a second passage inlet 229b, a second passage outlet 230b, and a second outlet port 236b. The third precleaner 210c can include the third precleaner intake 220c, a third duct 215c, the third dust ejector 240c, and a third valve 245c. The third precleaner intake 220c can include a third intake wall 222c and a portion of third flow paths 224c. The third flow paths 224c can each include a third passage 228c. The third passage 228c can have a third passage inlet 229c, a third passage outlet 230c, and a third outlet port 236c. The third precleaner 210c can include a third precleaner outlet wall 250c. The third precleaner outlet wall 250c can include a third precleaner outlet 255c.

A portion of the third precleaner outlet wall 250c can be adjacent to a portion of the second precleaner outlet wall 250b. In an embodiment, the third precleaner outlet wall 250c is integral with and molded with the housing 205. The plenum 260 can be formed by the second precleaner outlet wall 250b, the third precleaner outlet wall 250c, and the housing 205. The third precleaner outlets 255c can be in fluid communication with the plenum 260.

Figure 5:
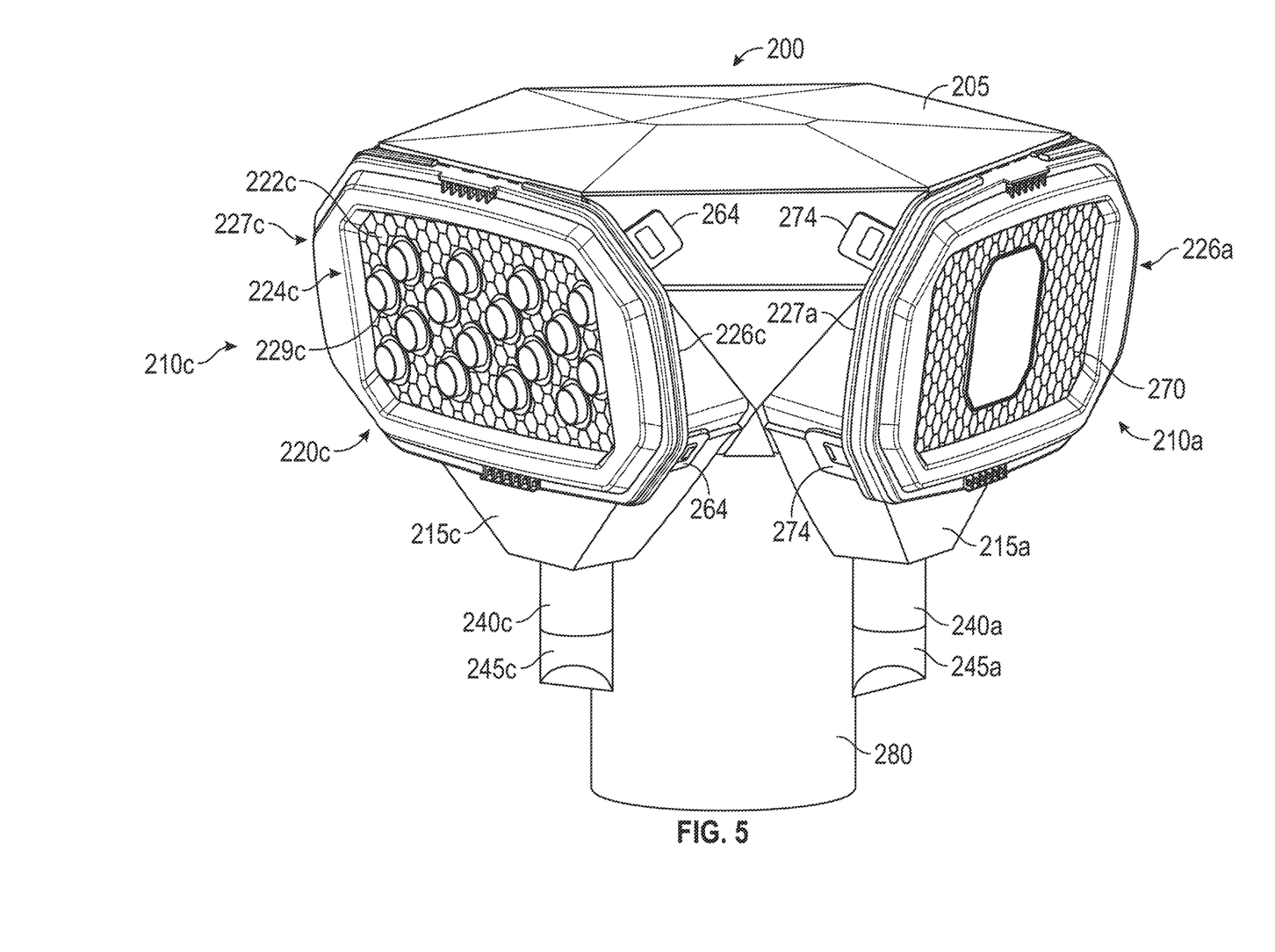
FIG. 5 is a perspective view of the exemplary precleaner from FIG. 2 with a cover.

FIG. 5 is a perspective view of the precleaner system from FIG. 2 with a cover. The precleaner system 200 can include a cover 270 that is formed to cap, restrict, or cover one or more of the precleaner intakes 220a, 220b, 220c. The cover 270 can have clips 274 that can be disposed proximate the top and bottom of the cover 270 and be formed to connect the cover 270 to the precleaners 210a, 210b, 210c. As shown in FIG. 5, the cover 270 can be disposed over one or more of the precleaner intakes 220a, 220b, 220c and block flow paths 224a, 224b, 224c from environmental air. Covers 270, can be a first cover and a second cover, and can each block a different intake wall 222a, 222b, 222c and can restrict airflow to one or more of precleaner intakes 220a, 220b, 220c and prevent intake air from entering flow paths 224a, 224b, 224c. The third precleaner intake 220c can have a third precleaner intake left side 227c and a third intake right side 226c. The third intake left side 227c can be disposed on the left side of the third precleaner intake 220c and the third intake right side 226c can be disposed on the right side of the third precleaner intake 220c. The first precleaner intake 220a can have a first intake left side 227a disposed opposite from the first intake right side 226a. The first intake left side 227a can be disposed proximate to the third intake right side 226c.

INDUSTRIAL APPLICABILITY

The present disclosure generally applies to precleaning intake air for air intake systems 100 used with engines 50. It is understood that the engine 50 may be used with any stationary or mobile machine known in the art. Such machines may be used in construction, farming, mining, power generation, and/or other like applications. Accordingly, such machines may include, for example, excavators, track-type tractors, wheel loaders, on-road vehicles, off-road vehicles, generator sets, motor graders, or other like machines. The engine 50 associated with such machines, and with air intake system 100, may comprise a diesel, gasoline, natural gas, and/or other like engine 50 known in the art. The disclosed precleaner system 200 can tune the airflow speed and provide peak air cleaner efficiency.

The precleaner system 200 can operate as follows: a gas flow stream containing particulate matter flows through the passage inlet 229a, 229b, 229c of each of the flow paths 224a, 224b, 224c in each of the precleaners 210a, 210b, 210c. The flow is induced to rotate within the flow paths 224a, 224b, 224c. The rotating nature of the flow stream causes centrifugal forces to act on the particulate matter in the gas flow stream. The particulate matter is heavier than the gas in the flow stream and migrates toward the wall of the passages 228a, 228b, 228c. The particles are ejected from the outlet ports 236a, 236b, 236c, while the remaining gas stream flows towards the passage outlets 230a, 230b, 230c and through the precleaner outlets 255a, 255b, 255c. The plenum 260 can be formed by the precleaner outlet walls 250a, 250b, 250c and the housing 205 and can collect the air flowing downstream from each of the precleaner outlets 255a, 255b, 255c. The precleaned gas stream flows from the plenum 260, through the precleaner system outlet 280, and can flow through the air passage 520, towards the primary filter cartridge 510. The particulate matter that is ejected from the outlet ports 236a, 236b, 236c falls by gravity downwardly into the ducts 215a, 215b, 215c. Ducts 215a, 215b, 215c funnel the particulate matter into the dust ejectors 240a, 240b, 240c where the particulate matter ejects from the precleaner system 200 via valves 245a, 245b, 245c. The valves 245a, 245b, 245c can be operable to allow for the flow of particulate matter to escape the precleaner system 200 by opening through direct pressure. The valves 245a, 245b, 245c can be operable to remain closed without the presence of direct pressure and prevent air from entering the precleaner system 200. Clips 264 can be used to attach the precleaner intakes 220a, 220b, 220c, to the respective precleaners 210a, 210b, 210c.

A method for using the precleaner system 100 includes determining the intake airflow requirement of an engine dependent on environmental factors such as the composition, size, and amount of particulate matter to be removed from the intake air. The method further including tuning the intake airflow speed by blocking airflow through one or more of the precleaners.

Covers 270 can replace one or more of the precleaner intakes 220a, 220b, 220c and block air from passing through precleaner outlets 255a, 255b, 255c of one or more of the precleaners 210a, 210b, 210c. Alternatively, the covers 270 can be placed over one or more of the precleaner intakes 220a, 220b, 220c to block the flow paths 224a, 224b, 224c exposed to environmental air of one or more precleaners 210a, 210b, 210c. The covers 270 can be formed to attach to precleaners 210a, 210b, 210c, via the clips 274. The covers 270 can be operable to tune airflow speed through the precleaner system 200 by blocking at least one of precleaner outlets 255a, 255b, 255c or the flow paths 224a, 224b, 224c. Using one or more covers 270 can allow for tuning of the airflow speed to remove the target amount of particulate matter from the air before entering the primary filter cartridge 510. Alternatively the restricted airflow may be used to account for different engine 50 sizes.

Although this invention has been shown and described with respect to detailed embodiments thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of air intake system 100 or engine 50. For example, the described embodiments may be applied to machines employed in mining, construction, farming, and power generation applications, or any variant thereof. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

It will be understood that the benefits and advantages described above may relate to one embodiment or may relate to several embodiments. The embodiments are not limited to those that have any or all of the stated benefits and advantages.

What is claimed is:

1. A precleaner system for precleaning intake air for an air intake system, the precleaner system comprising:
   a plurality of cyclonic precleaners, each precleaner including
      a precleaner outlet wall, having a plurality of precleaner outlets extending through the precleaner outlet wall, each precleaner outlet in fluid communication with the intake air;
   a housing extending between each precleaner and formed to position the plurality of precleaners in a predetermined relationship to each other;
   a plenum formed by the housing and the precleaner outlet wall from each of the plurality of precleaners, the plenum in fluid communication with the plurality of precleaner outlets;
   a system outlet in the shape of a hollow cylinder extending away from the housing and in fluid communication with the plenum;
   a first cover formed to completely block intake air from passing through one of the plurality of precleaners; and
   wherein each of the plurality of cyclonic precleaners further includes clips disposed proximate to the precleaner outlet wall and formed to connect each of the plurality of cyclonic precleaners to the housing.

2. The precleaner system of claim 1, wherein the precleaner system further comprises a second cover formed to block intake air from passing through a plurality of precleaner outlets of at least one of the plurality of precleaners.

3. The precleaner system of claim 1, wherein plurality of precleaners comprises at least three precleaners.

4. The precleaner system of claim 1, wherein each precleaner further comprises a dust ejector having a valve.

5. The precleaner system of claim 4, wherein the valve is a flap valve.

6. The precleaner system of claim 1, wherein the each precleaner further comprises a flap valve.

7. A precleaner system to remove particulate matter from intake air for an air intake system, the precleaner system comprising:
   a first cyclonic precleaner including
      a first precleaner intake, having
         a first intake wall, and
         a plurality of first flow paths extending through the first intake wall, each flow path having a first outlet port disposed opposite from the first intake wall,
      a first precleaner outlet wall having a plurality of first precleaner outlets extending through the first precleaner outlet wall and into the plurality of first flow paths, the plurality of first precleaner outlets in fluid communication with the plurality of first flow paths, and
      a first dust ejector in fluid communication with each first outlet port, having a first valve disposed opposite from the first outlet port;
   a second cyclonic precleaner having
      a second precleaner intake, having
         a second intake wall, and
         a plurality of second flow paths extending through the second intake wall, each second flow path having a second outlet port disposed opposite from the second intake wall,
      a second precleaner outlet wall having a plurality of second precleaner outlets extending through the second precleaner outlet wall and into the plurality of second flow paths, the plurality of second precleaner outlets in fluid communication with the plurality of second flow paths, and
      a second dust ejector in fluid communication with each second outlet port having a second valve disposed opposite from the first outlet port;
   a third cyclonic precleaner having
      a third precleaner intake having
         a third intake wall, and
         third flow paths extending through the second intake wall, each having a third outlet port disposed opposite from the third intake wall,
      a third precleaner outlet wall having a plurality of third precleaner outlets extending through the third precleaner outlet wall and into the plurality of second flow paths, the plurality of third precleaner outlets in fluid communication with the third flow path, and
      a third dust ejector in fluid communication with each third outlet port and having a third valve disposed opposite from the second outlet port;
   a housing extending between the first precleaner, second precleaner, and third precleaner, and formed to receive a portion of the first precleaner, the second precleaner, and the third precleaner;
   a plenum in fluid communication with the plurality of first precleaner outlets, the plurality of second precleaner outlets, and the plurality of third precleaner outlets;
   a precleaner system outlet disposed downstream of the plenum, in the shape of a hollow cylinder extending away from the plenum and in fluid communication with the plenum;
   a first cover formed to completely block at least one of the plurality of first flow paths, the plurality of second flow paths, and the plurality of third flow paths; and
   wherein the first precleaner, second precleaner, and third precleaner further comprise clips disposed proximate to the first intake wall, second intake wall, and third intake wall, the clips formed to connect the first intake wall, second intake wall, and third intake wall, to their respective first precleaner, second precleaner, and third precleaner.

8. The precleaner system of claim 7, wherein the first valve, the second valve, and the third valve, each comprise a flap valve.

9. The precleaner system of claim 7, wherein the precleaner system further comprising a second cover formed to replace at least one of the first precleaner intake, the second precleaner intake, and third precleaner intake and block at least one of the plurality of first precleaner outlets, plurality of second precleaner outlets, and plurality of third intake outlets.

10. The precleaner system of claim 7, wherein the first cover includes a clip formed to connect to at least one of the first precleaner, second precleaner, and third precleaner.

11. A method for tuning intake airflow through the precleaner system of claim 7, the method comprising:
    determining the intake airflow requirement of the engine; and
    tuning the intake airflow speed with regards to a determined intake airflow requirement by completely blocking airflow through at least one of the plurality of precleaners.

12. The method of claim 11, wherein determining the intake airflow requirement of the engine is dependent on a size of particulate matter in the environmental air.

13. The method of claim 11, wherein determining the intake airflow requirement of the engine is dependent on a quantity of particulate matter in the environmental air.

14. The method of claim 11, wherein determining the intake airflow requirement of the engine is dependent on a composition of particulate matter in the environmental air.

15. The method of claim 11, wherein tuning the intake airflow speed with regards to a determined intake airflow requirement by blocking airflow through at least one of the plurality of precleaners includes blocking the plurality of precleaner outlets of at least one precleaner of the plurality of precleaners with a cover.

16. The method of claim 11, wherein tuning the intake airflow speed with regards to a determined intake airflow requirement by blocking airflow through at least one of the plurality of precleaners includes blocking the plurality of flow paths of at least one precleaner of the plurality of precleaners with a cover.

* * * * *